Patented Mar. 2, 1943

2,312,481

UNITED STATES PATENT OFFICE 2,312,481

SUBSTITUTED DERIVATIVES OF SATURATED OR UNSATURATED PREGNANE-DIONES

Tadeus Reichstein, Zurich, Switzerland, assignor, by mesne assignments, to Roche-Organon, Inc., Nutley, N. J., a corporation of New Jersey No Drawing. Application March 10, 1938, Serial No. 195,162. In Switzerland March 24, 1937

18 Claims. (Cl. 260—397.4)

In my application No. 195,161 a process was described for the production of saturated and unsaturated derivatives of pregnane-ol-3-one-20 bearing at the carbon atom C21 a halogen, a diazo group or a monovalent oxygenous group and which might contain further substituents in the ring system especially oxygen in different forms of combination. In particular the production of such derivatives as bear a free hydroxylgroup at the carbon atom C3, and a substituted hydroxylgroup or a halogen at the carbon-atom C21 was described. The general formula of such compounds hence is given by Formula I.

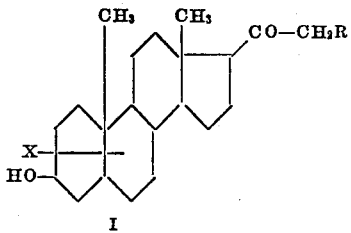

I

R—Halogen, O-Acyl, O-Alkyl
X—further substituents, double bonds etc. in the ring system.

Now it was found that these compounds may be converted by careful oxidation e. g. with chromic acid into the corresponding saturated or unsaturated derivatives of pregnane-dion-3.20, substituted at the carbon-atom C21 and possibly bearing further substituents in the ring system, the free hydroxylgroup at the carbon-atom C3 and possibly other free hydroxylgroups thereby being oxidized to a keto group or keto groups. Such oxydations are well known with derivatives of pregnane-ol-3-one-20 not substituted at the carbon atom C21.

However it was not at all certain that with the 21-substituted derivatives such oxydation might also be effected without damaging the sensitive side chain, as it had been found that these derivatives are extremely sensitive to many oxidising agents and e. g. are easily oxidized in the side chain by a cold ammoniacal silver solution. Special care is necessary if a double bond is present in the molecule especially one between the carbon atoms C5 and C6 as it is well known that in these cases the oxidation takes place in the double bond. So in this case the double bond is effectively protected according to known methods e. g. by addition of a halogen or a hydrogen halide and regeneration of the double bond after oxidation with simultaneous displacement of the double bond. However this treatment is only applicable to those derivatives bearing a protected hydroxyl group at the carbon atom C21. If a halogen is present at the carbon atom C21 the elimination of the halogen from the ring system would cause undesired reactions in the side chain. In the case of unsaturated derivatives with one double bond at the carbon-atom C5 the reaction can be carried out, simultaneously replacing the halogen by a hydroxyl or an acyloxyl group, as follows: After addition of a halogen and oxidation the product is heated with salts of organic or weak inorganic acids until the halogen in side chain has been replaced by a hydroxyl or an acyloxyl. Simultaneously one mol. of hydrogen halide is eliminated from the ring system, an unsaturated mono-halogenated ketone thus being produced. The halogen remaining at the carbon atom C6 can then be eliminated by reduction. However, this modification of the process is not particularly advantageous if derivatives substituted at the carbon atom C21 with oxygenous groups are to be prepared so that it is then preferred to start with derivatives bearing a protected hydroxyl group at the carbon atom C21. With saturated derivatives, however, the exchange of a halogen at the carbon atom C21 against a hydroxyl or a protected hydroxyl group does not meet with difficulties.

The polyketones with a free hydroxyl group at the carbon atom C21 are obtained by saponification of the corresponding derivatives with a hydroxyl group which had been acylated or alkoxylated with alkyls which can easily be eliminated by hydrolysis or alkoholysis preferably avoiding strongly alkaline agents although strong acids may be used in most cases. The hydroxy-21-ketones can also be prepared from the halogen-21-ketones by the action of salts of organic or weak inorganic acids in the presence of water or alcohols. As stated above, however, this is only applicable to the saturated derivatives.

Afterwards the hydroxyl group at the carbon atom C21 can again be acylated or alkoxylated. All of the reactions mentioned can appropriately be carried out in the presence of solvents or diluents. Moreover it is unnecessary to separate the compounds formed as intermediates. The process will be elucidated by formulation of a simple case viz. the preparation of derivatives of pregnene-4-dione-3,20, substituted in the carbon atom C21.

Afterwards examples will be given for the preparation of the compounds concerned.

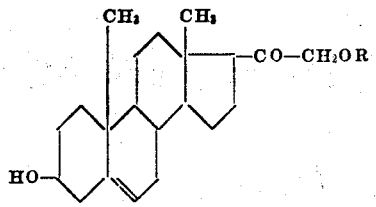

II

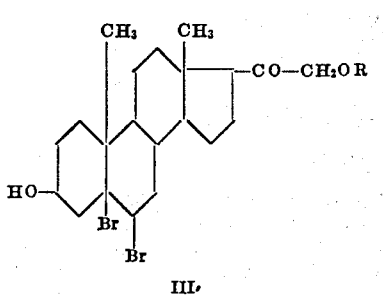

III'

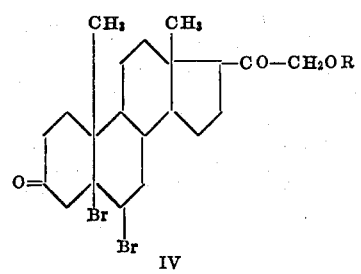

IV

R=Acyl or alkyl.

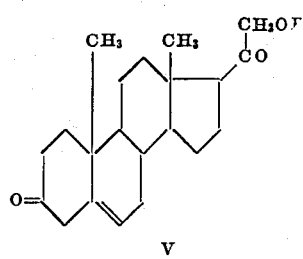

V

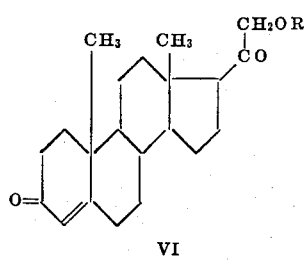

VI

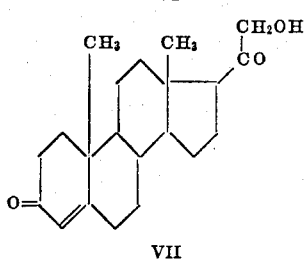

VII

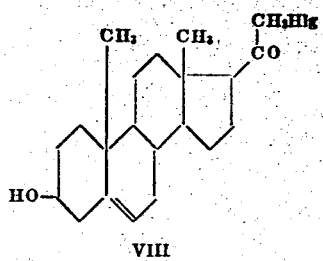

VIII

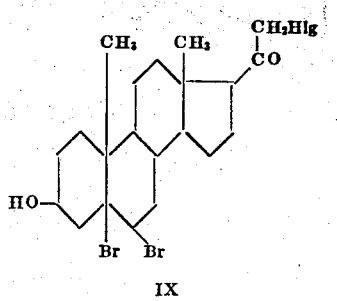

IX

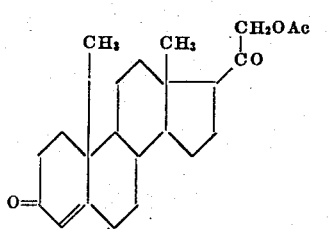

X

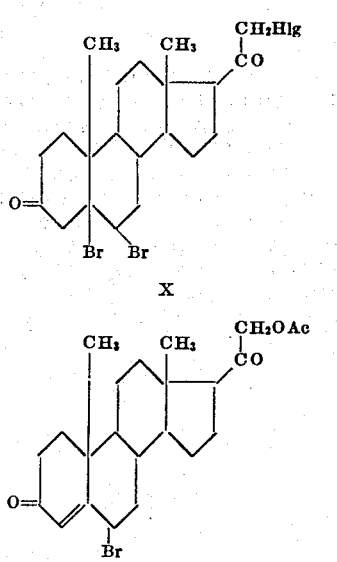

XI

For example one starts with acetoxy-21-pregnene-5-ol-3-one-20 (Formula II, R=acetyl). Bromine is added whereupon the dibromide (III) is oxidized with oxidizing agents e. g. chromic acid whereby the dibromoketone (IV) is formed. From this with reducing agents the unsaturated ketone (V) is formed which is converted by the action of an acid with displacement of the double bond into the isomeric unsaturated ketone (VI). Upon saponification of this compound the free hydroxy-diketone (VII) is obtained. The way used for unsaturated halogen-21-ketones is illustrated by Formulae (VIII) etc. After saturation of the double bond with bromine to obtain (IX) this is oxidized to (X) and by treatment with sodium acetate etc. this gives the ester of the unsaturated bromoketone of the probable Formula XI. From this the bromine atom can be removed with reducing agents, the diketone (VI, R=acyl) thus being formed.

In analogous ways the derivatives of pregnane with more than one free hydroxyl group in the ring system and halogen or a protected hydroxyl group at the carbon atom C21 can be converted into the corresponding polyketones. The compounds obtained will be used for the preparation of medicines.

Example 1

1 g. of acetoxy-21-pregnene-5-ol-3-one-20 (crystals with M. P. 180–182° (corrected) is dissolved in 5 ml. chloroform and to this is added a solution of 0.45 g. of bromine in chloroform at 0° C. only the last drops causing a permanent yellow colour. Shortly afterwards the solution is evaporated in vacuo, the residue being dissolved in a little glacial acetic acid and to this a solution of 0.75 g. of chromic acid in 30 ml. glacial acetic acid is added. The mixture is left to stand at room temperature for 12 hours. Then it is poured into water and the precipitating bromoketone is shaken out with ether. The ethereal solution is washed with some water, dried for a short period, and to it is added 2 g. of powdered zinc and 1 g. of water-free sodium acetate. The ether is evaporated, shaking now and then, the temperature of the bath being 60° C. and the residue is heated at the same temperature with frequent shaking for another 30 minutes, but at all events until a sample poured in water and extracted with ether has become free of bromine. Then the reaction mixture is taken up in ether, the solution is filtered, washed with water and evaporated. The crystalline residue is heated for 5 to 10 minutes with glacial acetic acid until gentle boiling and thereafter evaporated to dryness in vacuo. For purification the crystals can be sublimed in a high vacuum (a bath temperature of 190° and a pressure of 0.02 mm. gives with small amounts a sufficient velocity of distillation provided the heated surface is large enough) followed by recrystallisation from a small quantity of acetone, some petroleum ether being added.

Some 0.7 g. of pure acetoxy-21-pregnene-4-dione-3,20 are obtained as colourless needles which upon heating become opaque near 60° C. and melt at 158–160° C. (corrected). After being well dried their composition is $C_{23}H_{32}O_4$. A solution in ethanol or methanol rapidly reduces a cold ammoniacal silver solution in the cold and its ultra-violet absorption spectrum shows the band at about 240 m$\mu$ characteristic of alpha-beta unsaturated ketones. The compound is very soluble in glacial acetic acid, ethanol, methanol, acetone, dioxane and benzene, to a considerable extent in ether and only difficultly soluble in petroleum ether and water. In the reduction with zinc one may heat more intensely from the beginning whereby the subsequent treatment with glacial acetic acid to shift the debromination can be effected by heating for also other reducing agents can be used, so e. g. one hour with excessive sodium iodide, the same compound being formed. If ethanol is used as a solvent the acetyl group at the carbon atom C21 is often partially saponified, a free hydroxyl group being formed. Of course with the benzoate and other esters as a starting material the reactions proceed quite analogously.

Example 2

0.2 g. of the above acetoxy-21-pregnene-4-dione-3,20 are dissolved in 10 ml. of ethanol, 10 ml. of water and 1 ml. of concentrated hydrochloric acid are added after which the mixture is boiled with reflux for 40 minutes. After cooling the solution is concentrated in vacuo until beginning turbidity, after which it is left to crystallise. The well-developed colourless crystals are filtered with suction, washed with strongly diluted ethanol and then with water and finally dried in the air.

From the mother liquor the residual fraction is obtained by concentration.

Upon heating the crystals of pregnene-4-ol-21-dione-3,20 become opaque somewhat over 100° C. and melt at 137–139° C. After drying the composition is $C_{21}H_{30}O_3$. Their solution reduces a cold ammoniacal silver solution; it shows in the ultraviolet absorption spectrum the bands characteristic for cholestenone. The solubility is like that of the acetate, however, somewhat smaller in solvents not containing hydroxyl groups. From a small quantity of acetone well developed, characteristic long needles are obtained which often take the form of triangles or of cut triangles. The compound can be sublimated in a high vacuum without decomposition; at 0.02 mm. pressure and 190° bath temperature with a large heating surface the velocity of distillation is sufficient for small quantities.

It may be prepared in analogous ways from other esters and it can again be converted into other esters whilst with alkoxylating agents not having strongly alkaline reaction the ethers can be obtained.

Example 3

0.3 g. of crude triphenylmethoxy-21-pregnene-5-ol-3-one-20 are dissolved in chloroform and treated with 0.08 g. of bromine in chloroform as described in Example 1. After evaporation in vacuo the residue is dissolved without heating in the required amount of glacial acetic acid and 0.15 g. of chromic acid in 7 ml. of glacial acetic acid are added.

After standing for 8 hours at room temperature the mixture is poured into water and shaken out with ether; the ethereal solution is washed with water and dried over sodium sulfate, 0.5 g. of powdered zinc and some sodium acetate are added, the ether is evaporated on a water bath and the residue after addition of some ethanol is heated for another hour on a boiling water bath whereby besides debromination also displacement of the double bond and elimination of the triphenylmethyl residue from the molecule occurs. The ethanol is evaporated in vacuo, ether is added and the solution is filtered, washed with water and sodium carbonate solution, dried and evaporated. For complete elimination of the triphenylmethyl group the residue may be heated again with aqueous ethanol and hydrochloric acid and thereupon evaporated to dryness in vacuo. The triphenylcarbinol formed can then be eliminated by partitioning the mixture between aqueous ethanol or about 50% methanol and petroleum ether. From the aqueous alcoholic solutions the pregnene-4-ol-21-dione-3,20 is obtained as described in Example 2.

Example 4

0.22 g. of chloro-21-pregnene-5-ol-3-one-20 (colourless needles; M. P. 162–164° C., corrected) are brominated in chloroform with 0.108 g. of bromine and thereafter treated at room temperature with 0.2 g. of chromic acid, as described above. The mixture is poured into water and shaken out with ether. The ethereal solution is washed with water, dried and evaporated at 50° C.

The residue is heated for several hours on a water bath with 3 ml. of glacial acetic acid and 0.8 g. of water-free sodium acetate. Then 0.5 g. powdered zinc are added and the heating is continued for about half an hour, depending on the quality of the zinc but at all events so long that a sample poured into water and taken up in ether is practically free of halogen. Then the mixture is diluted with much ether, filtered, washed with water and sodium carbonate solution and evaporated to dryness. Appropriately the residue is first distilled in a high vacuum followed by absorption e. g. on active aluminium oxide from benzene-petrolether solution and elution with ether and acetone. Finally the product is recrystallized as described in Example 1. The crystals formed are identical with those described there.

For the reaction of saturated halogen-21-pregnane-derivatives with sodium acetate in glacial acetic acid, it is advantageous to heat to somewhat higher temperatures, e. g. 3 hours at 130° C.; then the acetoxy-21-ketones are immediately obtained in pure form. However, with the dibromo-derivatives it is better not to heat too intensely.

What I claim is:

1. As a new compound pregnene-4-dione-3,20-ol-21 having the general formula $C_{21}H_{30}O_3$ and the structure:

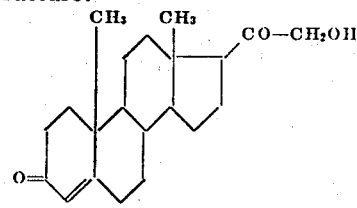

it forms long needles, often triangles or cut triangles are observed becoming opaque at approximately 100° C. and melting at 137–139° C. (corr.); a solution of this compound reduces an ammoniacal silver solution in the cold; the ultraviolet spectrum shows the typical band of the α-β-unsaturated ketones at 240 mμ and the compound is soluble in glacial acetic acid, ethanol, methanol, acetone, dioxane, benzene, ether, sparingly soluble in petroleumether and water.

2. The derivatives of cyclopentano-dimethyl-polyhydrophenanthrene having the empirical formula $C_{21}H_{29}O_2R$ and the structure

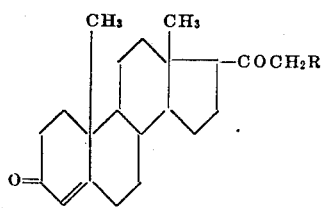

wherein R is a radical from the group consisting of halogen, hydroxyl, acyloxyl, aralkoxyl, and alkoxyl.

3. The process which comprises oxidizing a compound having the empirical formula

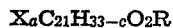
$X_aC_{21}H_{33-c}O_2R$ and the structural formula

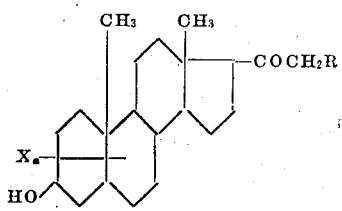

wherein X indicates substituents in the ring system from the group consisting of hydroxyl, halogent, acyloxyl, alkoxyl, and keto groups, a denotes a number from the group of zero and an integer, c denotes the number of hydrogen atoms substituted, and R is a radical from the group consisting of halogen, acyloxyl, aralkoxyl, and alkoxyl, to convert secondary hydroxyl groups in the ring system to keto groups.

4. The process which comprises oxidizing a compound having the empirical formula

$Hlg_2X_aC_{21}H_{31-c}O_2R$ and the structural formula

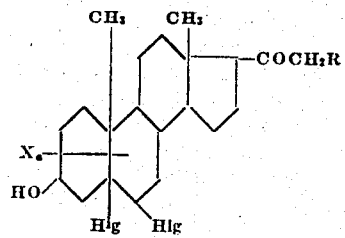

wherein X indicates substituents in the ring system from the group consisting of hydroxyl, halogen, acyloxyl, alkoxyl, and keto groups, a denotes a number from the group of zero and an integer, c denotes the number of hydrogen atoms substituted, R is a radical from the group consisting of halogen, acyloxyl, aralkoxyl, and alkoxyl, and Hlg is a halogen, to convert secondary hydroxyl groups in the ring system to keto groups and thereafter treating the oxidized compound with a reducing agent to eliminate halogen from the ring system.

5. The process which comprises oxidizing a compound having the empirical formula

$Hlg_2X_aC_{21}H_{31-c}O_2R$ and the structural formula

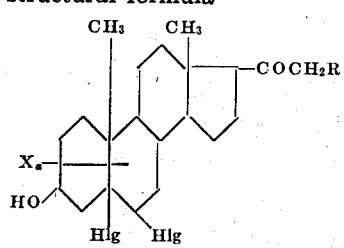

wherein X indicates substituents in the ring system from the group consisting of halogen, hydroxyl, acyloxyl, alkoxyl, and keto groups, a denotes a number from the group of zero and an integer, c denotes the number of hydrogen atoms substituted, R is a radical from the group consisting of halogen, acyloxyl aralkoxyl, and alkoxyl and Hlg is a halogen, to convert secondary hydroxyl groups in the ring system to keto groups and thereafter treating the oxidized compound with a reagent from the class consisting of salts of organic and weak inorganic acids and subsequently eliminating any halogen remaining in the ring system by treatment with a reducing agent.

6. The derivatives of the cyclopentano-dimethyl-polyhydro-phenanthrene having the empirical formula $C_{21}H_{29}O_2R$ and the structural formula

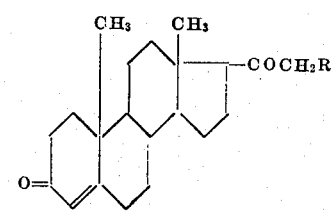

wherein R is an acyloxyl group.

7. The derivatives of the cyclopentano-dimethyl-polyhydro-phenanthrene having the empirical formula $C_{21}H_{29}O_2R$ and the structural formula

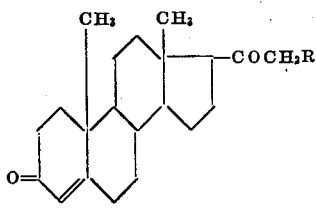

wherein R is an alkoxyl group.

8. Process for the manufacture of acyl derivatives of $\Delta^4$-3.20-diketo-21-hydroxy-pregnenes, comprising treating a $\Delta^4$-3.20-diketo-21-hydroxy-pregene with an acylating agent.

9. The aliphatic acyl derivatives of $\Delta^4$-3.20-diketo-21-hydroxy-pregnenes.

10. The acetate of $\Delta^4$-3.20-diketo-21-hydroxy-pregnene having the melting point of substantially 158 to 160° C.

11. The process which comprises oxidizing dibrom-5.6 - acetoxy - 21 - pregnane - ol - 3 - one - 20 to convert the secondary hydroxyl group in the ring system to a keto group and thereafter treating the oxidized compound with a reducing agent to eliminate halogen from the ring system.

12. The process which comprises oxidizing dibrom - 5.6 - chloro - 21 - pregnane - ol - 3 - one - 20 to convert the secondary hydroxyl group in the ring system to a keto group and thereafter treating the oxidized compound with a reagent from the class consisting of salts of organic and weak inorganic acids and subsequently eliminating any halogen remaining in the ring system by treatment with a reducing agent.

13. The process which comprises oxidizing a compound of the 3-hydroxy-10,13-dimethyl-17-monomethylketo - cyclopentanopolyhydrophenanthrene series having a 21-position substituent selected from the group consisting of halogen, acyloxyl, aralkoxyl, and alkoxyl, to convert the 3-position hydroxyl group to a keto group.

14. The process which comprises oxidizing a 3 - hydroxy - 5,6 - dibrom - 17 - monomethylketo - 21 - triphenylenethoxy - cyclopentanopolyhydrophenanthrene, to convert secondary hydroxyl groups in the ring system to keto groups, thereafter treating the oxidized compound with a reagent from the class consisting of salts of organic and weak inorganic acids, and subsequently eliminating any halogen remaining in the ring system by treatment with a reducing agent.

15. Compounds of the cyclopentanopolyhydrophenanthrene series having a keto group substituent in the third position and a seventeen position substituent of the form $.COCH_2R$, wherein R is a radical from the group consisting of halogen, hydroxyl, acyloxyl, aralkoxyl and alkoxyl.

16. Compounds of the nuclearly unsaturated cyclopentanopolyhydrophenanthrene series having a keto group substituent in the third position and a seventeen position substituent of the form $.COCH_2R$, wherein R is a radical from the group consisting of halogen, hydroxyl, acyloxyl, aralkoxyl and alkoxyl.

17. Compounds of the cyclopentanopolyhydrophenanthrene series having a keto group substituent in the third position and a seventeen position substituent of the form $.COCH_2R$, wherein R is a radical capable of conversion to a hydroxyl group by hydrolysis.

18. The process that comprises selectively oxidizing a compound of the cyclopentanodimethylpolyhydrophenanthrene series having a 3-position hydroxyl group substituent, halogen nuclear substituents on adjacent carbon atoms, and a 17-position substituent of the form: $.COCH_2R$, wherein R is a radical selected from the class consisting of halogen, acyloxyl, aralkoxyl and alkoxyl, to convert the 3-position secondary hydroxyl group substituent to a keto group; and thereafter treating the oxidized compound with a reducing agent to eliminate halogen substituents of the nucleus.

TADEUS REICHSTEIN.